(12) United States Patent
Miyazoe et al.

(10) Patent No.: US 6,505,642 B2
(45) Date of Patent: Jan. 14, 2003

(54) MANIFOLD VALVE HAVING POSITION DETECTING FUNCTION

(75) Inventors: Shinji Miyazoe, Tsukuba-gun (JP); Makoto Ishikawa, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 09/933,841

(22) Filed: Aug. 22, 2001

(65) Prior Publication Data

US 2002/0029809 A1 Mar. 14, 2002

(30) Foreign Application Priority Data

Sep. 12, 2000 (JP) ........................................ 2000-276684

(51) Int. Cl.⁷ ........................ F16K 37/00; F15B 13/043
(52) U.S. Cl. ............. 137/554; 137/625.64; 137/625.65; 137/884
(58) Field of Search ............................ 137/554, 625.64, 137/625.65, 884; 251/367

(56) References Cited

U.S. PATENT DOCUMENTS

| | | | | |
|---|---|---|---|---|
| 4,928,730 A | * | 5/1990 | Ando et al. | 137/554 |
| 6,164,323 A | * | 12/2000 | Smith et al. | 137/554 |
| 6,220,284 B1 | * | 4/2001 | Hayashi et al. | 137/554 |
| 6,267,140 B1 | * | 7/2001 | Hayashi et al. | 137/554 |
| 6,283,149 B1 | * | 9/2001 | Hayashi et al. | 137/554 |
| 6,386,229 B1 | * | 5/2002 | Morikawa et al. | 137/552 |
| 6,427,720 B1 | * | 8/2002 | Hayashi et al. | 137/554 |

FOREIGN PATENT DOCUMENTS

JP 2-66784 5/1990

* cited by examiner

*Primary Examiner*—A. Michael Chambers
(74) *Attorney, Agent, or Firm*—Oblon, Spivak, McClelland, Maier & Neustadt, P.C.

(57) ABSTRACT

A manifold valve in which mounting of a magnetometric sensor is easy and wiring is easy and which is easy to handle in maintenance and has a position detecting function is obtained. This valve is formed of a solenoid valve 1, a manifold base 2, and an intermediate block 3 disposed between the solenoid valve 1 and the manifold base 2. The solenoid valve 1 includes a magnet 20 for detecting a position and moving in synchronization with a spool 8 and a depression 22 in which a sensor is to be mounted and which is provided in a position corresponding to the magnet 20. The manifold base 2 includes a first plug 28 to be connected to a controller for controlling the solenoid valve. The intermediate block 3 includes a projecting portion 37 to be fitted in the depression 22, a magnetometric sensor 21 housed in the projecting portion 37, and an insertion hole 43 through which a conductor 44 connecting the magnetometric sensor 21 and the first plug 28 is inserted.

10 Claims, 6 Drawing Sheets

MANIFOLD VALVE HAVING POSITION DETECTING FUNCTION

TECHNICAL FIELD

The present invention relates to a manifold valve with a position detecting function for detecting an operating position of a solenoid valve placed on a manifold base by using a magnet and a magnetometric sensor.

PRIOR ART

There is a known solenoid vale in which an operating position of a spool can be detected by using a magnet and a magnetometric sensor as disclosed in Japanese Utility Model Application Laid-open No. 2-66784, for example. This solenoid valve is formed by mounting the magnet to an outer periphery of the spool and mounting the magnetometric sensor for sensing magnetism to a casing. When the spool moves to one switching position, the magnetometric sensor senses the magnet and is turned on. When the spool moves to the other switching position, the magnetometric sensor is separated from the magnet and turned off. The magnetometric sensor is connected to a controller by a lead which is led outside from the casing of the solenoid valve.

On the other hand, solenoid valves of this type includes one used as a manifold valve when it is placed on a manifold base. This manifold valve is normally formed by placing one or more solenoid valves on the manifold base such that pressure fluid and power are supplied together to the respective solenoid valves through the manifold base.

In such a manifold valve, similarly to the above-described known art, it is possible to detect the operating positions of the respective solenoid valves by using the magnet and the magnetometric sensor. In this case, however, it is necessary to route a conductor outside the casing and to introduce and connect the conductor into an electric connection portion of the manifold base if the magnetometric sensor is mounted to the casing of the solenoid valve like in the know art. As a result, problems such as burdensome and disorderly wiring and interference of the conductor with other operations are likely to occur. Because the sensor connected by the conductor to the manifold base has to be detached from the casing or the conductor has to be cut off from the manifold base in order to separate the manifold base and the solenoid valve from each other in maintenance, handling is burdensome.

Although the above problems can be solved by providing insertion holes in the solenoid valve and the manifold base and guiding the conductor to the electric connection portion through the insertion holes, it is difficult to newly provide the through holes for the conductor because a plurality of flow paths, mounting holes, and the like are already provided to the solenoid valve and the manifold base in complicated manners.

DISCLOSURE OF THE INVENTION

It is a technical object of the present invention to provide a manifold valve in which mounting of a magnetometric sensor is easy and wiring is easy and which is easy to handle in maintenance and has a position detecting function.

To achieve the above object, according to the invention, there is provided a manifold valve formed by successively piling and integrally connecting a solenoid valve for controlling pressure fluid, a manifold base for supplying the pressure fluid and power to the solenoid valve, and an intermediate block disposed between the solenoid valve and the manifold base.

The solenoid valve includes a casing having a mounting face for mounting the solenoid valve to the intermediate block, a valve member for controlling fluid and provided in the casing, solenoid-type driving means for driving the valve member, a plurality of through holes opening in the mounting face of the casing, a magnet for detecting a position and provided to move in synchronization with the valve member, and a depression in which a sensor is to be mounted and which is provided to the mounting face of the casing so as to correspond to the magnet.

The manifold base includes a placing face on which the intermediate block is placed, a plurality of through holes opening in the placing face, and a first plug to be connected to a controller for controlling the solenoid valve.

The intermediate block includes a first mounting face on an upper face side and on which the solenoid valve is placed, a second mounting face on a bottom face side for placing the intermediate block on the manifold base, a plurality of connecting holes for connecting the through holes of the solenoid valve and the manifold base to one another, at least one magnetometric sensor disposed in a position on the first mounting face corresponding to the depression formed in the solenoid valve so as to project from the first mounting face toward the solenoid valve and fitted in the depression when the solenoid valve is placed on the first mounting face, and an insertion hole through which a conductor connecting the magnetometric sensor and the first plug is inserted.

In the manifold valve of the invention having the above structure, the intermediate block is disposed between the manifold base and the solenoid valve, the magnetometric sensor is provided to the intermediate block, and the insertion hole through which the conductor for connecting the magnetometric sensor and the first plug in the manifold base is inserted is formed. Therefore, mounting of the magnetometric sensor is easy and wiring is easy and can be carried out neatly because the conductor does not need to be routed outside. Moreover, because it is unnecessary to newly provide the insertion holes in the solenoid valve and the manifold base in which the plurality of flow paths, mounting holes, and the like are disposed in complicated manners, a structure is simple and design is easy.

The magnetometric sensor is provided to the intermediate block in the projecting state, the depression is formed in the casing of the solenoid valve, and the magnetometric sensor is mounted in a predetermined position in the depression by mounting the solenoid valve onto the intermediate block. Therefore, mounting of the magnetometric sensor is easy. Furthermore, because it is unnecessary to detach the magnetometric sensor from the manifold base and to cut off the conductor from the manifold base in separating the manifold base and the solenoid valve from each other for maintenance, handling is easy.

In the invention, it is preferable that a hollow projecting portion to be fitted in the depression is provided to the first mounting face of the intermediate block and the projecting portion functions as positioning means in connecting the intermediate block and the solenoid valve and as a holder for holding the magnetometric sensor projecting from the first mounting face of the intermediate block by housing the magnetometric sensor in the projecting portion.

According to a concrete structural mode of the invention, the solenoid valve is a spool-type solenoid valve, the driving means is one or two solenoid-operated pilot valve(s) and has on opposite sides of the valve member pistons respectively operated by operation of pilot fluid. The magnet is mounted to any of the valve member and the pistons or a magnet holder is disposed between one of the pistons and the valve member to move in synchronization with the piston and the valve member and the magnet is mounted to the magnet holder.

It is preferable that the magnet is mounted to be separated from the pressure fluid or the pilot fluid.

DETAILED DESCRIPTION OF THE INVENTION

Figure 1:
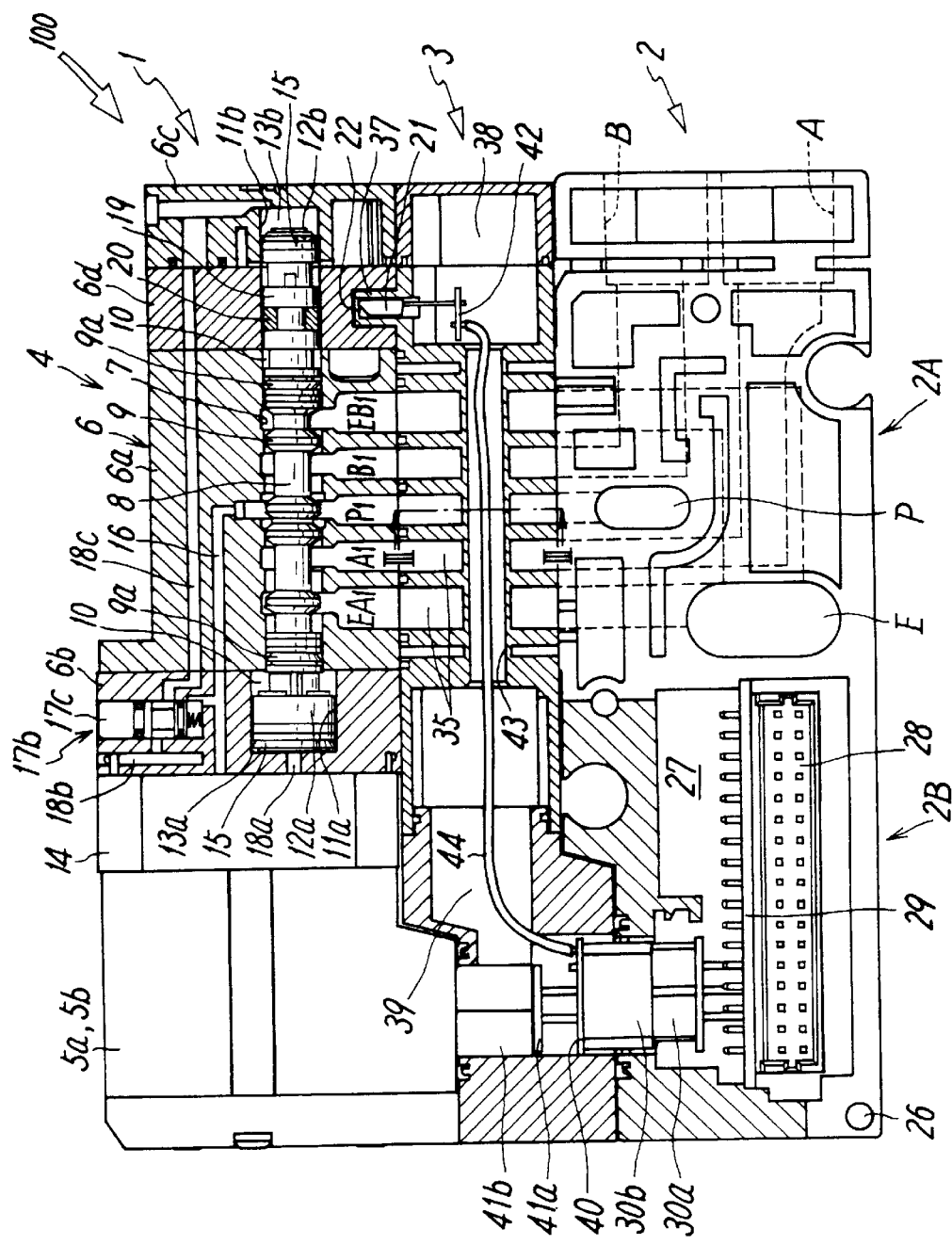
FIG. 1 is a sectional view of an essential portion of a first embodiment of a manifold valve according to the present invention.
Figure 2:
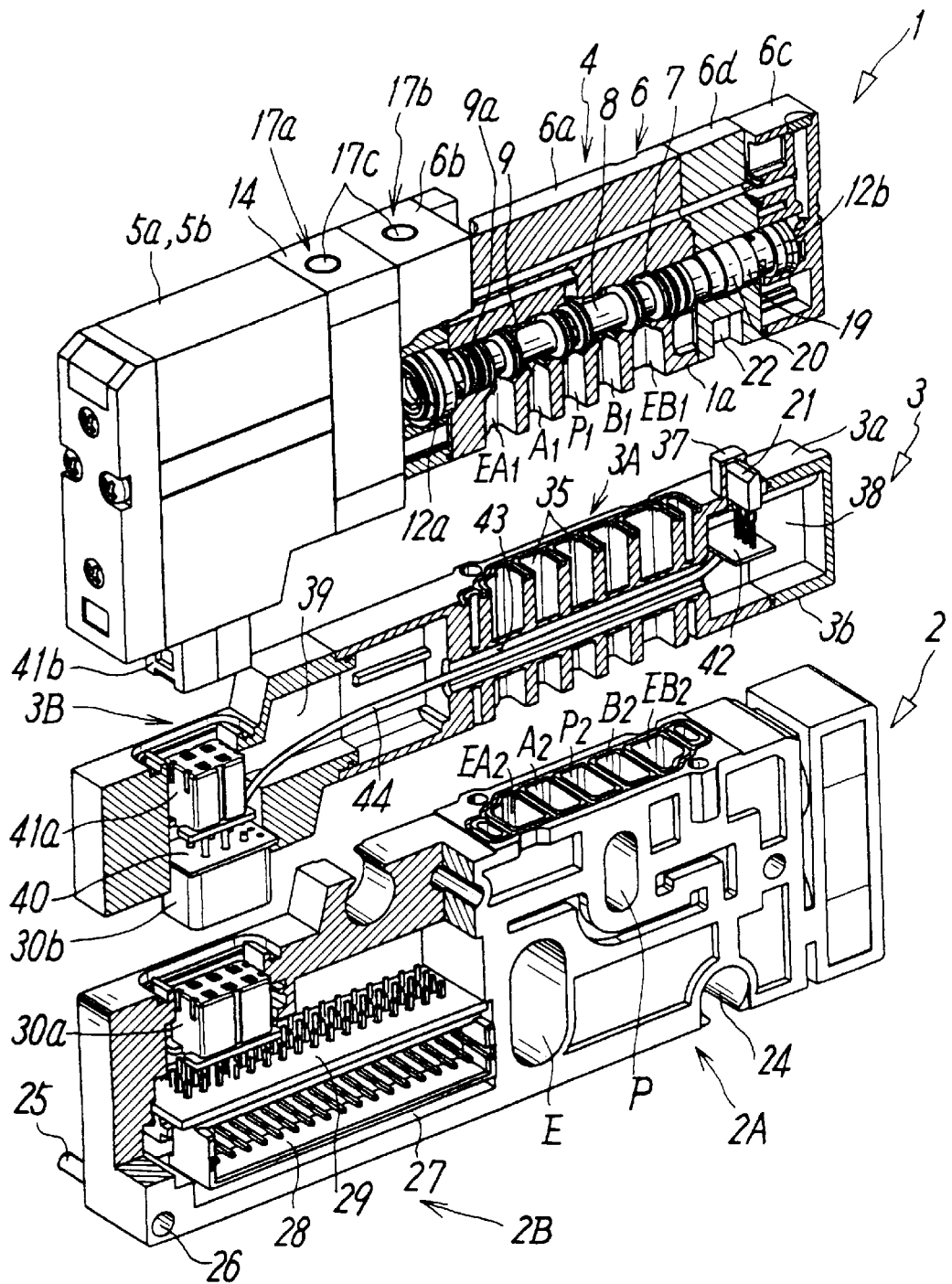
FIG. 2 is a perspective view showing a manifold valve in FIG. 1 in an exploded view and an essential portion in a cutaway view.
Figure 3:
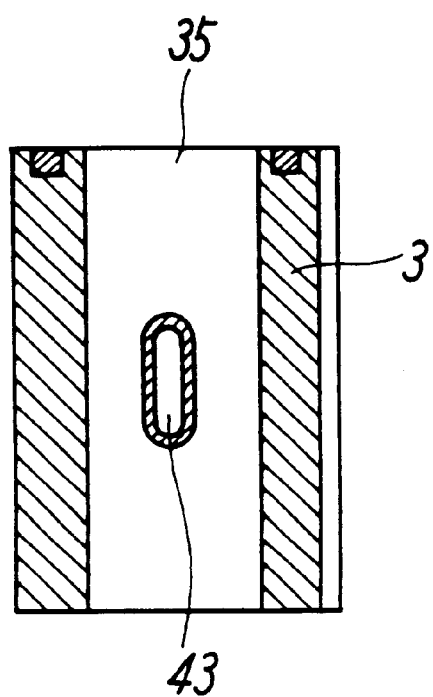
FIG. 3 is a sectional view taken along a line III—III in FIG. 1.

FIGS. 1 to 3 show a first embodiment of a manifold valve according to the present invention. This manifold valve 100 is formed by successively piling and integrally connecting a solenoid valve 1 for controlling pressure fluid such as compressed air, a manifold base 2 for supplying the pressure fluid and power to the solenoid valve 1, and an intermediate block 3 disposed between the solenoid valve 1 and the manifold base 2.

The solenoid valve 1 is a double-pilot-type solenoid valve and includes a main valve 4 and two solenoid-operated pilot valves 5a and 5b mounted side by side to an end of the main valve 4 and the main valve 4 is switched by using these pilot valves 5a and 5b. The main valve 4 is formed as a five-port valve and has a casing 6 formed of non-magnetic material. The casing 6 is formed of a first member 6a having a rectangular section, a second member 6b connected to an end of the first member 6a and also functioning as an adaptor for mounting the pilot valves 5a and 5b, a third member 6c connected to the other end of the first member 6a and functioning as an end plate for closing an end portion of the casing, and a fourth member 6d disposed between the third member 6c and the first member 6a and a lower face of the casing 6 is formed as a substantially flat mounting face 1a so as to mount and fix the casing 6 onto an upper face of the intermediate block.

To a portion of the mounting face 1a corresponding to a bottom face of the first member 6a, a supply through hole $P_1$, two output through holes $A_1$ and $B_1$ positioned on opposite sides of the supply through hole $P_1$, and two discharge through holes $EA_1$ and $EB_1$ positioned on opposite sides of the output through holes $A_1$ and $B_1$ are provided. Inside the first member 6a, a valve hole 7 into which the respective through holes open side by side in an axial direction is provided and a spool 8 which is a valve member for switching flow paths is housed for sliding in the valve hole 7.

A plurality of sealing members 9 for partitioning a flow path connecting respective ports are provided to an outer periphery of the spool 8 and an end portion sealing member 9a for separating a breathing chamber 10 which each of end portions of the spool 8 faces and the flow path of working fluid in the valve hole 7 from each other is provided to an outer periphery of each of opposite end portions of the spool 8.

On the other hand, in the second member 6b and the third member 6c, pistonichambers 11a and 11b are formed respectively. Of the piston chambers 11a and 11b, the first piston chamber 11a formed in the second member 6b has a large diameter and a first piston 12a having a large diameter is housed for sliding in the first piston chamber 11a. The second piston chamber 11b formed in the third member 6c has a smaller diameter than the first piston chamber 11a and a second piston 12b having a small diameter is housed for sliding in the second piston chamber 11b. Of these pistons, the first piston 12a is detachably in contact with an end face of the spool 8 or integrally connected to the spool 8 and the other second piston 12b is in contact with an end face of the spool 8 through a magnet holder 19 provided for sliding in the fourth member 6d. The magnet holder 19 is in a circular cylindrical shape and slides in the breathing chamber 10 in synchronization with the spool 8 and the second piston 12b.

First and second pressure chambers 13a and 13b are respectively formed on back face sides of the respective pistons 12a and 12b, i.e., on faces opposite to faces on the spool 8 side. The breathing chambers 10, 10 which open outside through holes (not shown) are respectively formed between the respective pistons 12a and 12b and the spool 8. These pressure chambers 13a, 13b and the breathing chambers 10, 10 are air tightly separated from each other by pieces of piston packing 15, 15 mounted to outer peripheries of the pistons 12a and 12b.

The first pressure chamber 13a positioned on a side of the first piston 12a having the large diameter communicates with a supply port P through a pilot supply flow path 16, a manual operation mechanism 17a (see FIG. 2) provided to an auxiliary block 14, the one pilot valve 5a, and a pilot output flow path 18a. The second pressure chamber 13b positioned on a side of the second piston 12b having the small diameter communicates with the supply port P through the pilot supply flow path 16, the other pilot valve 5b, a pilot output flow path 18b, a manual operation mechanism 17b, and a pilot output flow path 18c.

When the one pilot valve 5a is turned off, the first pressure chamber 13a opens into the atmosphere, the other pilot valve 5b is turned on, and pilot fluid from the pilot supply flow path 16 is supplied to the second pressure chamber 13b through the pilot output flow paths 18b and 18c, the spool 8 is pushed by the second piston 12b to occupy a first switching position which is displaced leftward as shown in FIG. 1. If switching between the pilot valves 5a and 5b is carried out from this state such that the pilot valve 5a is turned on and that the pilot valve 5b is turned off, the second pressure chamber 13b opens into the atmosphere and the pilot fluid is supplied to the first pressure chamber 13a. Therefore, the spool 8 is pushed by the piston 12a, moved rightward, and switched to a second switching position.

The manual operation mechanisms 17a and 17b are respectively for manually obtaining switching states similar to the cases in which the pilot valves 5a and 5b are turned on and used during a power failure or when the pilot valves are out of order. In other words, the manual operation mechanism 17a corresponds to the pilot valve 5a. By pushing down an operation member 17c, the pilot supply flow path 16 and the pilot output flow path 18a directly communicate with each other and pilot fluid is supplied to the first pressure chamber 13a from the supply port P. The other manual operation mechanism 17b corresponds to the pilot valve 5b. By pushing down an operation member 17c, the pilot supply flow path 16 and the pilot output flow path 18c directly communicate with each other and the pilot fluid is supplied to the second pressure chamber 13b from the supply port P.

The pilot valves 5a and 5b are the solenoid-operated pilot valves for opening and closing the pilot flow paths by energization of a solenoid. Because structures and operations of the pilot valves 5a and 5b are similar to those of known pilot valves, concrete descriptions of them will be omitted.

To the magnet holder 19, a magnet 20 as a detected body in detecting an operating position of the spool 8 is mounted. For use as this magnet 20, one formed by mixing metal powder having a magnetic property into a soft elastic base material such as synthetic resin and synthetic rubber into a ring shape having a notch at a portion of a circumference is suitable, for example. The magnet 20 is mounted by fitting the magnet in a mounting groove formed on an outer periphery of the magnet holder 19 while elastically expanding a diameter of the magnet 20. By detecting the magnet 20 moving with the spool 8 with a magnetometric sensor 21 mounted to the intermediate block 3, the operating position of the spool 8 can be detected.

By providing the magnet 20 in the breathing chamber 10 as described above, it is possible to prevent the magnet 20 from coming in contact with the pressure fluid or the pilot fluid. Therefore, if moisture, chemical mist, particles of magnetic material such as metal powder, and the like are included in the fluid, the magnet 20 does not rust or corrode in contact with the moisture and chemical mist and does not adsorb the particles of magnetic material. As a result, reduction of accuracy of position detection due to reduction of magnetic force and an inoperable state of the spool 8 due to the adsorbed minute particles do not occur.

In the mounting face 1a of the casing 6 of the solenoid valve 1, a depression 22 having a substantially rectangular sectional shape in which the magnetometric sensor 21 is fitted is formed in a position which is a bottom face of the fourth member 6d to have such a depth as to be close to the magnet 20.

The manifold base 2 is of a stacking type used by welding a plurality of manifold bases together in a thickness (width) direction and is formed of non-magnetic material. The manifold base 2 has a flow path forming portion 2A formed on a side of a half of the manifold base 2 and an electric connection portion 2B formed on a side of the other half. On an upper face of the manifold base 2, a placing face 2a is formed astride the flow path forming portion 2A and the electric connection portion 2B. The flow path forming portion 2A and the electric connection portion 2B may be formed integrally or may be formed separately and connected to each other.

In the flow path forming portion 2A, the supply flow path P and a discharge flow path E passing through the manifold base 2 in the thickness direction are formed and two output ports A and B which open in an end face of the manifold base 2 are formed. The supply flow path P and the discharge flow path E and the respective output ports A and B respectively communicate with a supply through hole $P_2$, two discharge through holes $EA_2$ and $EB_2$, and two output through holes $A_2$ and $B_2$ through connecting holes formed in the flow path forming portion 2A opening in the mounting face 2a. When the solenoid valve is mounted onto the placing face 2a, these respective through holes respectively communicate with the supply through hole $P_1$, the two discharge through holes $EA_1$ and $EB_1$, and the two output through holes $A_1$ and $B_1$ opening in the mounting face 1a of the solenoid valve.

In the drawing, a reference numeral 24 designates a fastening hole through which a bolt is inserted in joining and fastening the plurality of manifold bases 2 to each other and reference numerals 25 and 26 designate positioning projection and fitting hole provided to positions facing each other on opposite faces of the manifold base 2 and the projection 25 is fitted in the fitting hole 26 of an adjacent manifold base 2.

The electric connection portion 2B includes a housing chamber 27 in which electrical components for connection are housed. In this housing chamber 27, a first plug 28 to which a first socket (not shown) at a tip end of a conductor led from a controller for controlling the solenoid valve is connected, a first printed circuit board 29 electrically connected to the first plug 28, and a second socket 30a connected to the first printed circuit board 29 are provided. To the second socket 30a, a second plug 30b mounted to the intermediate block 3 is connected.

The intermediate block 3 is mounted between the solenoid valve 1 and the manifold base 2 so as not to project outside. The intermediate block 3 is formed to have substantially the same length and thickness (width) as the solenoid valve 1 or the manifold base 2 and has a first mounting face 3a on an upper face side onto which the solenoid valve 1 is mounted and a second mounting face 3b on a bottom face side for mounting the intermediate block 3 onto the manifold base 2.

The intermediate block 3 is formed of a first portion 3A corresponding to the main valve 4 of the solenoid valve 1 and the flow path forming portion 2A of the manifold base 2 and a second portion 3B corresponding to the pilot valves 5a and 5b and the electric connection portion 2B of the manifold base 2. A plurality of connecting holes 35 for connecting the first mounting face 3a and the second mounting face 3b are provided in the first portion 3A and the plurality of through holes which respectively open in the mounting face 1a of the solenoid valve 1 and the placing face 2a of the manifold base 2 are connected to each other by the connecting holes 35.

A cap-shaped projecting portion 37 having a rectangular section in such a size as to substantially fit in the depression 22 is formed to project upward in a position of the first mounting face 3a of the intermediate block 3 and corresponding to the depression 22 formed in the solenoid valve 1. The magnetometric sensor 21 is inserted into the projecting portion 37 from a side of a first relay chamber 38 provided in the intermediate block 3 and the magnetometric sensor 21 is held by the projecting portion 37 to project from the placing face 2a toward the solenoid valve 1. By placing the solenoid valve 1 on the first mounting face 3a, the projecting portion 37 is fitted in the depression to position the intermediate block 3 and the solenoid valve 1 with respect to each other and the magnetometric sensor 21 is mounted in a fitted state in the depression 22 through the projecting portion 37. Therefore, the projecting portion 37 functions as positioning means used in connecting the intermediate block 3 and the solenoid valve 1 and as a holder for holding the magnetometric sensor 21 projecting from the intermediate block 3. Although the projecting portion 37 is formed integrally with the intermediate block 3, the projecting portion 37 may be formed separately and fixed to the intermediate block 3.

On the other hand, a second relay chamber 39 is formed in the second portion 3B of the intermediate block 3. In the relay chamber 39, the second plug 30b, a second relay substrate 40 connected to the second plug 30b, and a third socket 41a connected to the second relay substrate 40 are provided. When the solenoid valve 1 is mounted onto the first mounting face 3a, the third socket 41a is connected to a third plug 41b mounted to the solenoid valve 1. To the second relay substrate 40, the magnetometric sensor 21 is connected through a first relay substrate 42 provided in the first relay chamber 38 and a conductor 44 extending in an insertion hole 43. The insertion hole 43 is formed in a central portion of the intermediate block 3 so as to connect both the relay chambers 38 and 39 as can be seen from FIG. 3. The insertion hole 43 extends across centers of the plurality of connecting holes 35 but is separated from the connecting holes 35.

Although the intermediate block 3 is formed by connecting the plurality of members, the entire intermediate block 3 may be formed as an integral body.

In the manifold valve 100 having the above structure, the intermediate block 3 is disposed between the manifold base 2 and the solenoid valve 1, the magnetometric sensor 21 is held on the intermediate block 3, and the insertion hole 43 through which the conductor 44 for connecting the magnetometric sensor 21 and the first plug 28 in the manifold base 2 is inserted is formed. Therefore, mounting of the magnetometric sensor 21 is easy and wiring is easy and can be carried out neatly because the conductor 44 does not need to be routed outside. Moreover, because it is unnecessary to newly provide the insertion hole 43 in the solenoid valve 1 and the manifold base 2 in which the plurality of flow paths, mounting holes, and the like are disposed in complicated manners, a structure is simple and design is easy.

The magnetometric sensor 21 is provided to the intermediate block 3 in the projecting state, the depression 22 is formed in the casing 6 of the solenoid valve 1, and the magnetometric sensor 21 is automatically mounted in a predetermined position in the depression 22 by mounting the solenoid valve 1 onto the intermediate block 3. Therefore, mounting of the magnetometric sensor 21 is easy. Furthermore, because it is unnecessary to detach the magnetometric sensor 21 from the manifold base 1 and to cut off the conductor 44 from the manifold base 2 in separating the manifold base 2 and the solenoid valve 1 from each other for maintenance, handling is easy.

Moreover, the fourth member 6d is provided as a part of the casing 6 of the solenoid valve 1, the magnet holder 19 is provided in the fourth member 6d, and the magnet 20 is mounted to the magnet holder 19. Therefore, mounting of the magnet 20 is easy.

Although the magnet holder 19 and the magnet 20 are provided on a side of the casing 6 opposite to a side to which the pilot valves 5a and 5b are mounted, i.e., between the first member 6a and the third member 6c by retaining the magnet holder 19 and the magnet 20 in the fourth member 6d in the above embodiment, it is also possible to provide the magnet holder 19 and the magnet 20 on the side to which the pilot valves 5a and 5b are mounted, i.e., between the first member 6a and the second member 6b. Needless to say, the magnetometric sensor 21 is also provided in a position corresponding to the magnet holder 19 and the magnet 20 in this case.

Figure 4:
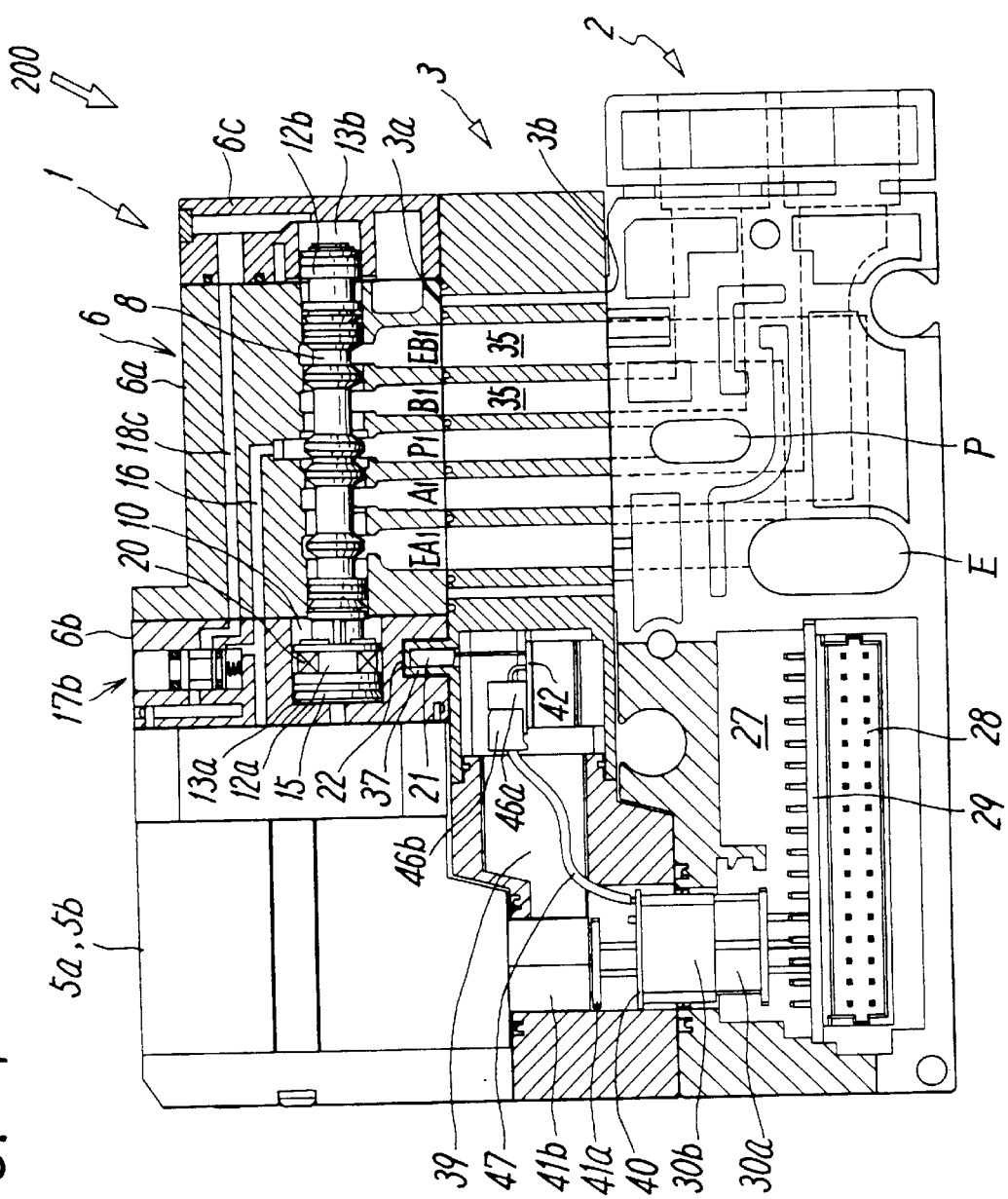
FIG. 4 is a sectional view of a second embodiment of the manifold valve according to the invention.
Figure 5:
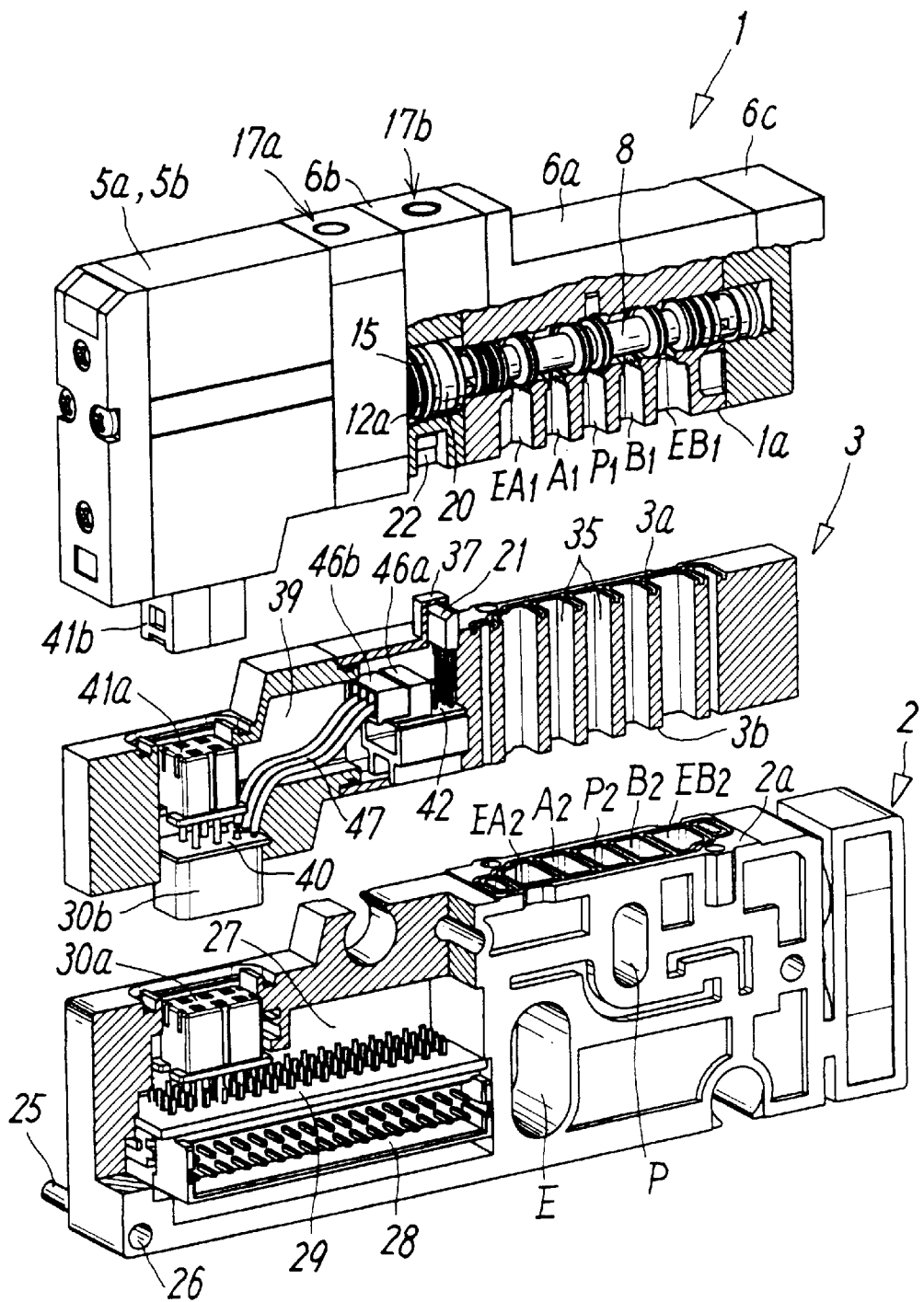
FIG. 5 is a perspective view showing a manifold valve in FIG. 4 in an exploded view and an essential portion in a cutaway view.

FIGS. 4 and 5 show a second embodiment of the manifold valve according to the invention. The manifold valve 200 of the second embodiment is different from the manifold valve 100 of the first embodiment in that the magnet 20 is directly mounted to the piston without providing the above fourth member 6d and magnet holder 19 in the second embodiment while the fourth member 6d is provided to the casing 6, the magnet holder 19 is retained in the fourth member 6d, and the magnet 20 is mounted to the magnet holder 19 in the first embodiment. In other words, the magnet 20 is mounted to the outer periphery of the first piston 12a having the large diameter, the depression 22 is formed in a lower face of the second member 6b of the casing 6, and the projecting portion 37 is formed in a position of the intermediate block 3 corresponding to the depression 22 of the first mounting face 3a to retain the magnetometric sensor 21.

The magnet 20 is prevented from coming in contact with the pilot fluid by being mounted to a position of the piston 12a closer to the breathing chamber 10 than to the piston packing 15.

The magnetometric sensor 21 is connected to the second relay substrate 40 through the first relay substrate 42 disposed in the second relay chamber 39, a fourth socket 46a connected to the first relay substrate 42, a fourth plug 46b detachably connected to the fourth socket 46a, and a conductor 47 connected to the fourth plug 46b.

Therefore, in this second embodiment, the first relay chamber 38 and the insertion hole 43 are not provided in the intermediate block 3 unlike the first embodiment and the second relay chamber 39 also functions as the insertion hole 43. However, it is of course possible to use the intermediate block 3 provided with the first relay chamber 38 and the insertion hole 43 in this case.

Because structures of the second embodiment other than those described above are substantially similar to those of the first embodiment, the main similar components are provided with similar reference numerals to the first embodiment to omit description of the components.

Instead of mounting the magnet 20 to the first piston 12a, it is also possible to mount the magnet 20 to the opposite second piston 12b. In this case, the depression 22 and the magnetometric sensor 21 are also provided in positions corresponding to the magnet 20. As the intermediate block 3, one having the first relay chamber 38 and the insertion hole 43 like in the first embodiment is used and the conductor from the magnetometric sensor 21 is connected to the second relay substrate 40 through the insertion hole 43.

Figure 6:
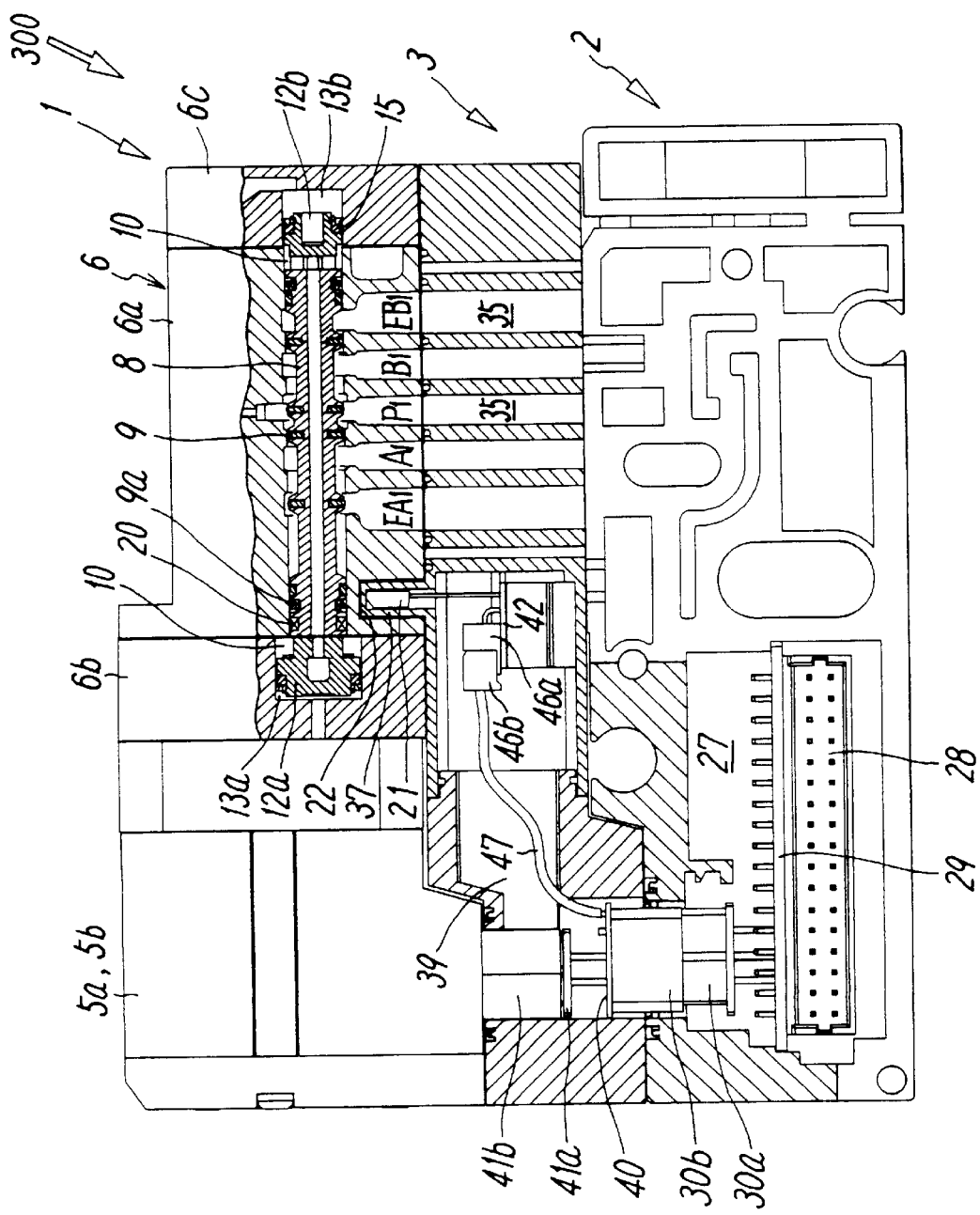
FIG. 6 is a sectional view of an essential portion of a third embodiment of the manifold valve of the invention.

FIG. 6 shows a third embodiment of the manifold valve according to the invention. The manifold valve 300 of the third embodiment is different from the first and second embodiments in that the magnet 20 is directly mounted to the spool 8. In other words, the magnet 20 is mounted to a position of the end portion of the spool 8 closer to the breathing chamber 10 than to the end portion sealing member 9a in a state in which the magnet 20 is completely isolated from the pressure fluid. In this case, the depression 22 is formed in a lower face of the first member 6a of the casing 6 and the projecting portion 37 for retaining the magnetometric sensor 21 is formed in a position of the intermediate block 3 corresponding to the depression 22.

Because structures of the third embodiment other than those described above are substantially similar to those of the second embodiment, the main similar components are provided with similar reference numerals to the second embodiment to omit description of the components.

Although the hollow cap-shaped projecting portion 37 is formed in the intermediate block 3 and the magnetometric sensor 21 is housed in the projecting portion 37 to thereby retain the magnetometric sensor 21 projecting from the first mounting face 3a on the intermediate block 3 in the above respective embodiments, a mounting method of the magnetometric sensor 21 is not limited to this method. For example, the projecting portion 37 may be formed into a shape of a hollow tube with an open tip end and the magnetometric sensor 21 may be housed in the projecting portion. It is also possible that the magnetometric sensor 21 may be mounted in the depression while being exposed outside without providing the projecting portion 37.

Although the one magnetometric sensor 21 is mounted in the depression 22 in the above respective embodiments, two or more magnetometric sensors may be mounted. By mounting a plurality of magnetometric sensors at necessary intervals, it is possible to easily and reliably detect positions of opposite stroke ends, a middle position of the stroke, or other arbitrary positions of the spool.

Although the two pistons have large and small different diameters in the solenoid valve of the above embodiments, it is also possible to use the pistons with the same diameters.

It is also possible to use a single-pilot-type solenoid valve in which the spool is switched by using one pilot valve as the solenoid valve.

The invention can also be applied to a manifold valve having a solenoid valve which is not of the spool type, e.g., a manifold valve having a poppet-type solenoid valve.

As described above in detail, according to the invention, it is possible to obtain the manifold valve in which mounting of the magnetometric sensor is easy and wiring is easy and which is easy to handle in maintenance and has the position detecting function.

What is claimed is:

1. A manifold valve having a position detecting function and formed by successively piling and integrally connecting a solenoid valve for controlling pressure fluid, a manifold base for supplying said pressure fluid and power to said solenoid valve, and an intermediate block disposed between said solenoid valve and said manifold base, wherein said solenoid valve includes a casing having a mounting face for mounting said solenoid valve to said intermediate block, a valve member for controlling fluid and provided in said casing, solenoid-type driving means for driving said valve member, a plurality of through holes opening in said mounting face of said casing, a magnet for detecting a position and provided to move in synchronization with said valve member, and a depression in which a sensor is to be mounted and which is provided to said mounting face of said casing so as to correspond to said magnet, said manifold base includes a placing face on which said intermediate block is placed, a plurality of through holes opening in said placing face, and a first plug to be connected to a controller for controlling said solenoid valve, and said intermediate block includes a first mounting face on an upper face side and on which said solenoid valve is placed, a second mounting face on a bottom face side for placing said intermediate block on said manifold base, a plurality of connecting holes for connecting said through holes of said solenoid valve and said manifold base to one another, at least one magnetometric sensor disposed in a position on said first mounting face corresponding to said depression formed in said solenoid valve so as to project from said first mounting face toward said solenoid valve and fitted in said depression when said solenoid valve is placed on said first mounting face, and an insertion hole through which a conductor connecting said magnetometric sensor and said first plug is inserted.

2. A manifold valve according to claim 1, wherein a hollow projecting portion to be fitted in said depression is provided to said first mounting face of said intermediate block and said projecting portion functions as positioning means in connecting said intermediate block and said solenoid valve and as a holder for holding said magnetometric sensor projecting from said first mounting face of said intermediate block by housing said magnetometric sensor in said projecting portion.

3. A manifold valve according to claim 2, wherein said solenoid valve is a spool-type solenoid valve, said driving means is one or two solenoid-operated pilot valve(s), said solenoid valve has on opposite sides of said valve member pistons respectively operated by operation of pilot fluid, and said magnet is mounted to any of said valve member and said pistons.

4. A manifold valve according to claim 2, wherein said solenoid valve is a spool-type solenoid valve, said driving means is one or two solenoid-operated pilot valve(s), said solenoid valve has on opposite sides of said valve member pistons respectively operated by operation of pilot fluid, a magnet holder is disposed between one of said pistons and said valve member to move in synchronization with said piston and said valve member, and said magnet is mounted to said magnet holder.

5. A manifold valve according to claim 4, wherein said pilot valve(s) is(are) mounted to an end face of said casing of said solenoid valve on a side of one of said pistons and said magnet holder is disposed between the other of said pistons and said valve member.

6. A manifold valve according to claim 1, wherein said solenoid valve is a spool-type solenoid valve, said driving means is one or two solenoid-operated pilot valve(s), said solenoid valve has on opposite sides of said valve member pistons respectively operated by operation of pilot fluid, and said magnet is mounted to any of said valve member and said pistons.

7. A manifold valve according to claim 6, wherein said magnet is mounted to be separated from said pressure fluid or said pilot fluid.

8. A manifold valve according to claim 1, wherein said solenoid valve is a spool-type solenoid valve, said driving means is one or two solenoid-operated pilot valve(s), said solenoid valve has on opposite sides of said valve member pistons respectively operated by operation of pilot fluid, a magnet holder is disposed between one of said pistons and said valve member to move in synchronization with said piston and said valve member, and said magnet is mounted to said magnet holder.

9. A manifold valve according to claim 8, wherein said pilot valve(s) is(are) mounted to an end face of said casing of said solenoid valve on a side of one of said pistons and said magnet holder is disposed between the other of said pistons and said valve member.

10. A manifold valve according to claim 8, wherein said magnet is mounted to be separated from said pressure fluid or said pilot fluid.

* * * * *